United States Patent
Kaigawa

(10) Patent No.: US 9,164,712 B2
(45) Date of Patent: Oct. 20, 2015

(54) FUNCTION EXECUTING DEVICE

(71) Applicant: BROTHER KOGYO KABUSHIKI KAISHA, Nagoya-shi, Aichi-ken (JP)

(72) Inventor: Shinsuke Kaigawa, Kitanagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/501,599

(22) Filed: Sep. 30, 2014

(65) Prior Publication Data

US 2015/0092225 A1    Apr. 2, 2015

(30) Foreign Application Priority Data

Sep. 30, 2013    (JP) .................................. 2013-203752

(51) Int. Cl.
G06F 3/12    (2006.01)

(52) U.S. Cl.
CPC ............ *G06F 3/1238* (2013.01); *G06F 3/1222* (2013.01); *G06F 3/1292* (2013.01)

(58) Field of Classification Search
USPC .................... 358/1.13, 1.14, 1.15, 1.6; 726/9; 370/254
See application file for complete search history.

(56) References Cited

U.S. PATENT DOCUMENTS

| | | | | |
|---|---|---|---|---|
| 8,739,263 | B2 * | 5/2014 | Azuma | 726/9 |
| 8,958,100 | B2 * | 2/2015 | Nishikawa et al. | 358/1.15 |
| 2008/0101273 | A1 * | 5/2008 | Everest | 370/315 |
| 2008/0222711 | A1 * | 9/2008 | Michaelis | 726/7 |
| 2009/0052348 | A1 * | 2/2009 | Kato et al. | 370/254 |
| 2014/0168687 | A1 * | 6/2014 | Kim et al. | 358/1.14 |

FOREIGN PATENT DOCUMENTS

| | | |
|---|---|---|
| JP | 2004-090243 A | 3/2004 |
| JP | 2004-209907 A | 7/2004 |

* cited by examiner

*Primary Examiner* — Allen H Nguyen
(74) *Attorney, Agent, or Firm* — Scully, Scott, Murphy & Presser, P.C.

(57) ABSTRACT

A function executing device includes a communication unit configured to perform wireless communication with an external device; a specific function unit configured to execute at least one specific function; a storage configured to store function execution restricting information; and a controller. The controller receives external receiving information, which is information including at least user authentication information. When the received external receiving information includes the specific function instruction information, the controller causes the specific function unit to execute the one of the at least one specific function. When the received external receiving information does not include the specific function instruction information, the controller determines whether an authentication target user is included in the at least one registered user. The controller sets the authentication target user as a current-authenticated user when it is determined that the authentication target user is included in the at least one registered user.

7 Claims, 5 Drawing Sheets

<USER REGISTRATION TABLE>

| USER ID / FUNCTION | PUBLIC | USER A | USER B | ------- |
|---|---|---|---|---|
| PRINT FUNCTION | OFF | ON | ON | ------- |
| SCAN FUNCTION | ON | ON | OFF | ------- |

US 9,164,712 B2

FUNCTION EXECUTING DEVICE

CROSS-REFERENCE TO RELATED APPLICATION

This application is based upon and claims the benefit of priority from Japanese Patent Application No. 2013-203752, filed Sep. 30, 2013; the entire contents of which are incorporated herein by reference.

BACKGROUND

Technical Field

The present invention relates to a function executing device.

A system has been known which includes a printing device having a near field communication interface and a printing instruction terminal capable of instructing the printing device to perform a printing operation by using the near field communication interface. The system transmits a printing instruction and print data from the printing instruction terminal to the printing device through the near field communication interface, thereby enabling the printing device to print the print data transmitted from the printing instruction terminal.

SUMMARY OF THE INVENTION

In the meantime, a printing device has been known which is configured to receive a specific authentication (login) operation, and restrict a usable function when authentication fails. The printing device permits an authenticated user to use a specific function or all functions when the authentication is successful.

Therefore, it is expected to provide a printing device having both a function of receiving a printing instruction from a printing instruction terminal by using a near field communication interface and a function of receiving an authentication operation.

It is therefore an object of the present invention to provide a function executing device capable of effectively executing both a specific function based on an instruction from an external device through wireless communication and a user authentication.

The present invention provides a function executing device comprising: a communication unit configured to perform wireless communication with an external device by a particular near field wireless communication format; a specific function unit configured to execute at least one specific function; a storage configured to store function execution restricting information indicating whether an execution of the at least one specific function is restricted for each of at least one registered user, and a controller, wherein the controller is configured to: receive external receiving information, which is information including at least user authentication information, from the external device through the communication unit, when the received external receiving information includes the specific function instruction information causing the specific function unit to execute one of the at least one specific function, cause the specific function unit to execute the one of the at least one specific function indicated by the specific function instruction information, when the received external receiving information does not include the specific function instruction information, determine whether an authentication target user, indicated by user authentication information included in the received external receiving information, is included in the at least one registered user, and set the authentication target user as a current-authenticated user when it is determined that the authentication target user is included in the at least one registered user.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which.

DETAILED DESCRIPTION OF EMBODIMENTS

Hereinafter, preferred illustrative embodiments of the present invention will be described with reference to the accompanying drawings. In the meantime, the present invention is not restricted to the specific means, structures and the like described in the illustrative embodiments, and a variety of shapes can be made without departing from the gist of the present invention. For example, a part of the configuration described in the illustrative embodiments may be replaced with the well-known configuration having the same function, added to or replaced with a configuration of another illustrative embodiment or omitted inasmuch as the problem can be solved. Also, a plurality of following illustrative embodiments may be appropriately combined.

First Illustrative Embodiment

Figure 1:
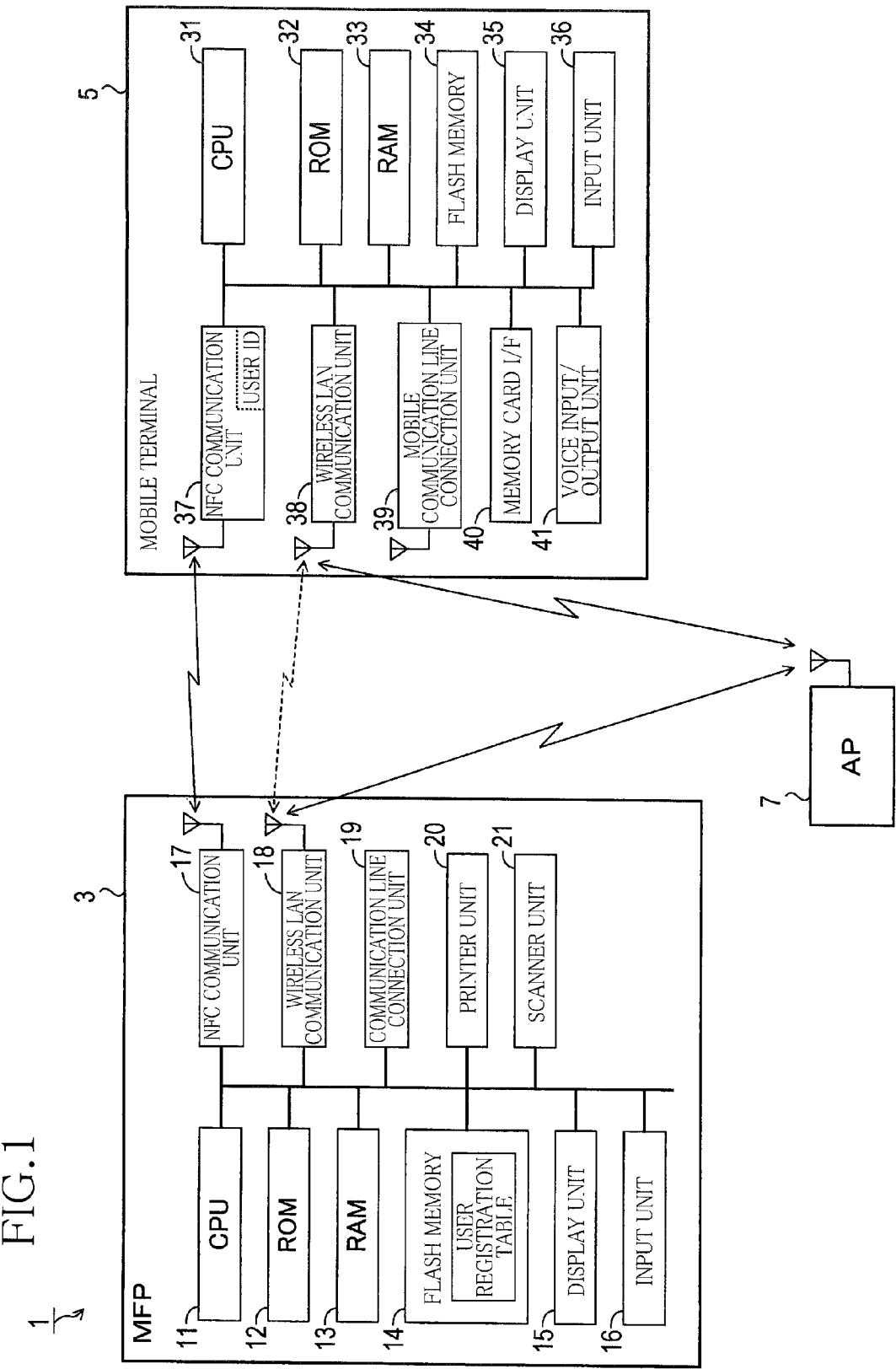
FIG. 1 illustrates a schematic configuration of a communication system 1 according to an illustrative embodiment.

As illustrated in FIG. 1, a communication system 1 of this illustrative embodiment includes an MFP (i.e. is referred to as "Multi Function Peripheral") 3, a mobile terminal 5 and an AP (i.e. is referred to as "Access Point") 7.

The MFP 3 has, as main functions, a variety of functions such as a print (printing) function, a scan (image reading) function, a facsimile function, a copy function and the like. The MFP 3 is provided with a CPU 11, a ROM 12, a RAM 13, a flash memory 14, a display unit 15, an input unit 16, an NFC communication unit 17, a wireless LAN communication unit 18, a communication line connection unit 19, a printer unit 20 and a scanner unit 21. The CPU 11 is configured to implement the various functions of the MFP 3, in response to a variety of programs and data stored in the ROM 12 and the flash memory 14.

The flash memory 14 is an electrically rewritable non-volatile memory. The flash memory 14 is configured to store therein a variety of application programs (hereinafter, simply also referred to as 'applications') for controlling operations of the MFP 3, protocol stacks, a variety of data and parameters including a user registration table (which will be described later), and the like.

The application program is a program causing the CPU 11 to execute processing of an application layer of an OSI reference model. The protocol stack includes a P2P program, an R/W program and a CE program. The P2P program is a program for executing processing in accordance with a P2P (i.e. is referred to as "Peer to Peer") mode of an NFC (i.e. is referred to as "Near Field Communication") standard. The R/W program is a program for executing processing in accordance with a Reader/Writer mode of the NFC standard. The CE program is a program for executing processing in accordance with a CE (i.e. is referred to as "Card Emulation") mode of the NFC standard. The programs are to execute the processing based on the NFC standard defined by an NFC Forum. In the meantime, the P2P mode, the Reader/Writer mode and the CE mode will be specifically described later.

The display unit 15 is a liquid crystal display device, in this illustrative embodiment, and is configured to display a variety of screens. The input unit 16 has a variety of operation keys, a touch panel and the like. The operation keys are mechanical keys provided for a housing of the MFP 3 and are configured to receive various setting values, an instruction and the like from a user. The touch panel is arranged to overlay on a liquid crystal display screen of the display unit 15.

The NFC communication unit 17 is an interface for performing wireless communication in a communication system of non-contact communication according to the NFC standard (hereinafter, referred to as 'NFC communication'). The NFC communication is near field wireless communication in which a communication-possible distance is short such as about 10 cm. In the meantime, the mobile terminal 5 also has an NFC communication unit 37. For this reason, the MFP 3 can perform NFC communication with the mobile terminal 5 through the NFC communication unit 17. The NFC communication between the MFP 3 and the mobile terminal 5 can be performed when the MFP 3 and the mobile terminal 5 are made to come close to each other so that a distance therebetween (specifically, a distance between an antenna of the NFC communication unit 17 of the MFP 3 and an antenna of the NFC communication unit 37 of the mobile terminal 5) is within the communication-possible distance of the NFC communication.

In this illustrative embodiment, the MFP 3 is a stationary type device and is basically used with being arranged at a particular place. On the other hand, the mobile terminal 5 is a small mobile communication terminal and can be easily carried. Therefore, the NFC communication between the MFP 3 and the mobile terminal 5 is normally performed by bringing (holding up) the mobile terminal 5 close to a particular neighboring part of the MFP 3. The neighboring part of the MFP 3 is a position just above the antenna of the NFC communication unit 17. Meanwhile, in below descriptions, when describing that a variety of communication devices capable of performing NFC communication, including the mobile terminal 5, are 'held up' over the MFP 3, it means that the communication device is brought close to the neighboring part of the MFP 3 so that the communication device and the MFP 3 can perform NFC communication.

The wireless LAN communication unit 18 is an interface for performing wireless communication through a wireless LAN. In this illustrative embodiment, the communication that is performed by the wireless LAN communication unit 18 is wireless communication by the wireless LAN conforming to standards of IEEE 802.11b/g. In this illustrative embodiment, the wireless LAN communication unit 18 can perform wireless LAN communication with another device, which can perform wireless LAN communication, in any one of an infrastructure mode through the AP 7 and an ad hoc mode, which is a direct connection mode. In the meantime, the mobile terminal 5 also has a wireless LAN communication unit 38. Therefore, the MFP 3 can perform wireless LAN communication with the mobile terminal 5 through the wireless LAN communication unit 18.

The communication line connection unit 19 is to connect a telephone line network (not illustrated) and the MFP 3, and is configured to control a connection state with the telephone line network by closing or cutting out a line. Also, the communication line connection unit 19 is configured to modulate image data to be transmitted into a signal capable of being transmitted to the telephone line network (not illustrated) and to transmit the same upon FAX transmission and to demodulate a signal input from the telephone line network into image data upon FAX reception.

The printer unit 20 is to implement a print function and is configured to print an image based on the image data on a recording sheet under control of the CPU 11. When it is intended to enable the printer unit 20 to execute a printing operation, a user can execute the printing operation by performing a particular operation for print execution through the input unit 16. Specifically, a print key may be displayed on the liquid crystal display screen and the print key may be tapped by the touch panel to execute a printing operation.

The scanner unit 21 is to implement a scan function and is configured to read a document and to convert the same into image data under control of the CPU 11. When it is intended to enable the scanner unit 21 to execute a scan operation, a user can execute the scan operation by setting a document and performing a particular operation for scan execution through the input unit 16. Specifically, a scan key may be displayed on the liquid crystal display screen and the scan key may be tapped by the touch panel to execute a scan operation.

The MFP 3 has an SFL (i.e. is referred to as "Secure Function Lock") function, as a security-related function. The SFL function is a function in which a usable function and an unusable function are previously set for each user and only the useable function is executable (in other words, the unusable function is not executable) in accordance with a setting of a user logging in to the MFP 3.

In the MFP 3, the SFL function can be set to be valid (ON) or invalid (OFF) by an SFL function setting operation. For example, it is possible to set the SFL function to be valid or invalid by logging in to the MFP with a specific user ID (for example, a user ID for administrator) and performing an SFL function setting operation. The login to the MFP 3 can be made by holding up a medium for login such as an IC card, a communication device and the like having a user ID stored therein and capable of performing NFC communication over the MFP 3.

When holding up the medium for login over the MFP 3, the NFC communication is performed between the medium for login and the MFP 3 and the user ID stored in the medium for login is transmitted to the MFP 3. In the MFP 3, a user capable of logging in to the MFP 3 can be registered in advance. The MFP 3 compares the user ID transmitted from the medium for login with the user ID registered in the MFP 3. When the transmitted user ID has been registered in the MFP 3, the MFP 3 performs login processing of the transmitted user ID.

In this illustrative embodiment, the mobile terminal 5 also can perform NFC communication and stores therein the user ID, which is also registered in the MFP 3. For this reason, when the mobile terminal 5 is held up over the MFP 3, it is possible to log in to the MFP 3 with the user ID of the mobile terminal 5.

When the SFL function is set to be invalid (OFF) in the MFP 3, all users can use the respective functions of the MFP 3 without particular restrictions. On the other hand, when the SFL function is set to be valid (ON), the usable function may be restricted depending on the user (user ID) logging in to the MFP 3.

Figures 2, 3:
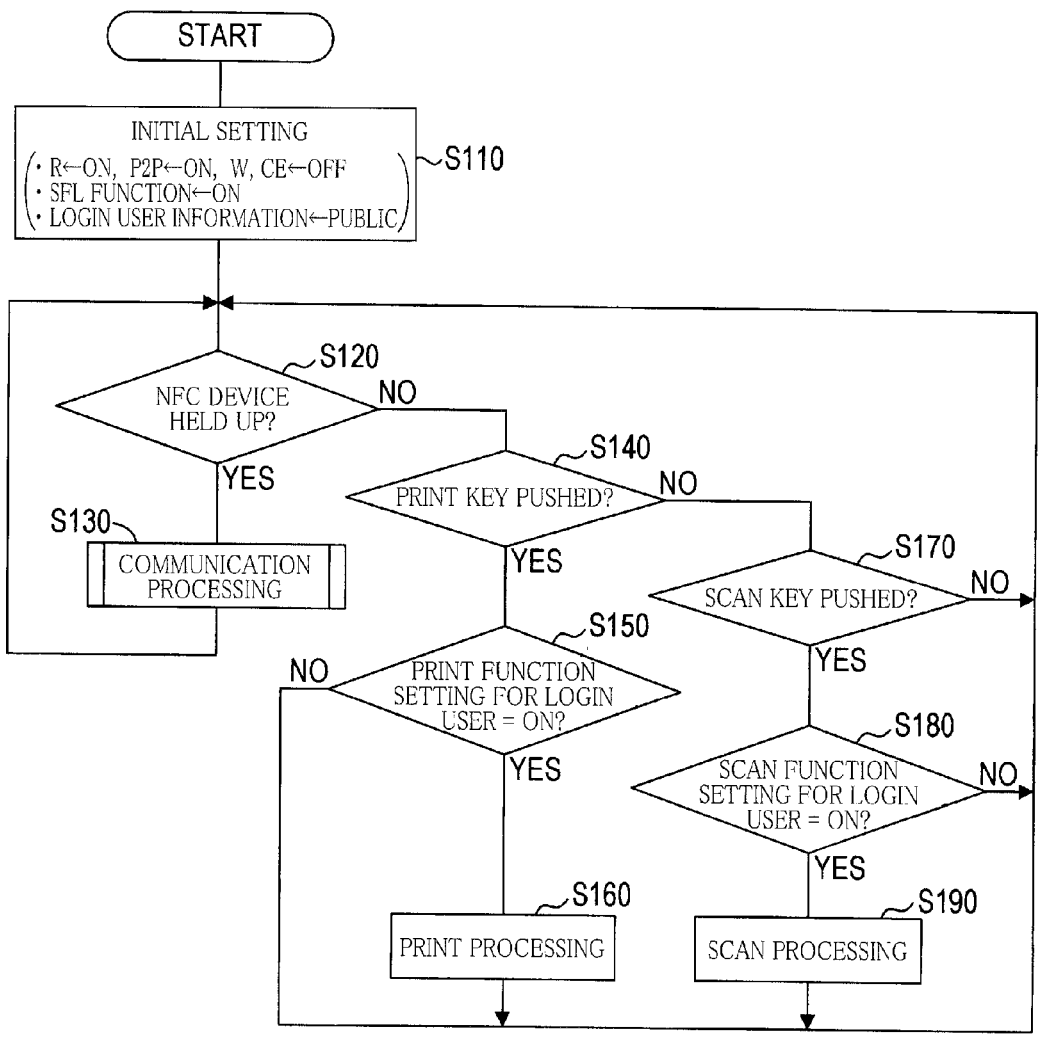
FIG. 2 illustrates a user registration table of an MFP 3.
FIG. 3 is a flowchart showing MFP control processing according to a first illustrative embodiment.

That is, in the MFP 3, one or more specific functions are set for each registered user ID as regards whether the functions can be used or not when the SFL function is valid. Specifically, as illustrated in FIG. 2, a print function and a scan function of the various functions of the MFP 3 are registered in advance in a user registration table as regards whether the corresponding function can be used (indicated as "ON", i.e., the function can be used) or cannot be used (indicated as "OFF", i.e., the function cannot be used) for each registered user ID when the SFL function is valid. The user registration table is stored in the flash memory 14 and is appropriately referred to when the SFL function is valid.

The user registration table illustrated in FIG. 2 illustrates an example where the print function is OFF (i.e., the print function cannot be used) and the scan function is ON (i.e., the scan function can be used) for a public user ID, both the print function and the scan function are ON for a user ID of a user A and the print function is ON and the scan function is OFF for a user ID of a user B.

For this reason, when the user A logs in, for example, the user A can use the respective functions of the MFP 3 without restrictions during the login. On the other hand, when the user B logs in, for example, the user B cannot use at least the scan function of the respective functions of the MFP 3 during the login.

Also, 'public' of the user ID indicates a state where nobody substantially logs in. That is, the MFP 3 always keeps/manages login user information indicating a logged-in user and sets the login user information to 'public' when nobody logs in. Therefore, when the SFL function is valid and nobody logs in, the print function cannot be used because the login user information of the MFP 3 is set to 'public'. In other words, even when the SFL function is valid, all users can use the other functions except for the print function, without restrictions.

When the login user information is 'public', if the user A logs in to the MFP 3 by holding up an IC card and the like over the MFP 3, the login user information is set to the user A. Thereby, all functions including the print function can be used during the login of the user A. Also, when the login user information is 'public', if the user B logs in to the MFP 3 by holding up an IC card and the like over the MFP 3, the login user information is set to the user B. Thereby, the scan function cannot be used but the print function can be used during the login of the user B.

The print and scan functions that can be executed in the MFP 3 are further described. In this illustrative embodiment, when the mobile terminal 5 is held up over the MFP 3, the image data stored in the mobile terminal 5 can be transmitted to the MFP 3 and printed. Hereinafter, the corresponding printing method is referred to as 'holding up print'. The mobile terminal 5 has an application (hereinafter, referred to as 'holding up print application') for holding up print installed therein.

When the holding up print application is activated and the image data, which is to be printed by the MFP 3, is designated in the mobile terminal 5 and the mobile terminal 5 is then held up over the MFP 3, the NFC communication (communication in the P2P mode) is performed between the mobile terminal 5 and the MFP 3. By the NFC communication, data including at least a user ID and a print instruction is transmitted from the mobile terminal 5 to the MFP 3. Also, the setting information necessary for the wireless LAN communication is transmitted from the MFP 3 to the mobile terminal 5.

After the NFC communication is performed between the mobile terminal 5 and the MFP 3, the image data is transmitted from the mobile terminal 5 to the MFP 3 by the wireless LAN communication. When the MFP 3 receives the image data from the mobile terminal 5, the MFP 3 prints an image of the image data.

Further, in this illustrative embodiment, when the mobile terminal 5 is held up over the MFP 3, it is possible to instruct the MFP 3 to execute the scan function from the mobile terminal 5, to receive scanned image data from the MFP 3 and to display/store the same in the mobile terminal 5. Hereinafter, the corresponding scan method is referred to as 'holding up scan'. The mobile terminal 5 has an application (hereinafter, referred to as 'holding up scan application') for holding up scan installed therein.

When a document, which is to be scanned, is set on the MFP 3, the holding up scan application is activated in the mobile terminal 5 and the mobile terminal 5 is then held up over the MFP 3, the NFC communication (communication in the P2P mode) is first performed between the mobile terminal 5 and the MFP 3. By the NFC communication, data including at least a user ID and a scan instruction is transmitted from the mobile terminal 5 to the MFP 3. Also, the setting information necessary for the wireless LAN communication is transmitted from the MFP 3 to the mobile terminal 5.

Thereby, the MFP 3 starts to scan the document. Also, after the NFC communication is performed between the mobile terminal 5 and the MFP 3, the wireless LAN communication therebetween becomes possible. When the scan of the document is completed, the MFP 3 transmits the scanned image data to the mobile terminal 5 through the wireless LAN communication.

The mobile terminal 5 is a smart phone, a mobile phone, a tablet terminal and the like, for example. In this illustrative embodiment, the mobile terminal 5 can use at least the P2P mode and the R/W mode, as the NFC communication mode. The mobile terminal 5 is provided with a CPU 31, a ROM 32, a RAM 33, a flash memory 34, a display unit 35, an input unit 36, the NFC communication unit 37, the wireless LAN communication unit 38, a mobile communication line connection unit 39, a memory card interface (memory card I/F) 40 and a voice input/output unit 41. The CPU 31 can implement a variety of functions of the mobile terminal 5, in response to various programs and data stored in the ROM 32 and the flash memory 34.

The flash memory 34 is an electrically rewritable non-transitory memory. The flash memory 34 is configured to store an operating system (hereinafter, referred to as 'OS') for controlling operations of the mobile terminal 5 and a variety of applications. In this illustrative embodiment, the OS is an android (registered trademark).

The applications stored in the flash memory 34 include at least the holding up print application and the holding up scan application. Both the two applications are applications that are provided by a vendor of the MFP 3, and are installed in the mobile terminal 5 by the user.

In this illustrative embodiment, the display unit 35 is a liquid crystal display device and is configured to display a variety of screens. The input unit 36 has a variety of operation keys, a touch panel and the like. The operation keys are mechanical keys provided for a housing of the mobile terminal 5 and are configured to receive various setting values, an instruction and the like from a user. The touch panel is arranged to overlay on a liquid crystal display screen of the display unit 35.

The NFC communication unit 37 is an interface for NFC communication, like the NFC communication unit 17 of the MFP 3. In the meantime, an inherent user ID is stored in the NFC communication unit 37 of the mobile terminal 5. The wireless LAN communication unit 38 is an interface for wireless LAN communication, like the wireless LAN communication unit 18 of the MFP 3. The mobile communication line connection unit 39 is a communication interface for performing voice call, data communication and the like through a mobile telephone network (not illustrated).

The memory card I/F 40 is an interface to which a non-transitory memory card (not illustrated) is mounted, and is configured to control writing or readout to or from the memory card. The voice input/output unit 41 is a device for voice input/output consisting of a microphone, a speaker and the like.

Here, the mode that can be used for the NFC communication is explained. Hereinafter, the device (the MFP 3, the mobile terminal 5 and the like) capable of performing NFC communication is collectively referred to as 'NFC device'. Also, in the below, the Reader mode and the Writer mode may be collectively referred to as 'R/W mode'.

The P2P mode is a mode for performing interactive communication between a pair of NFC devices. For example, when the P2P mode is activated in both a first NFC device and a second NFC device, a communication link (hereinafter, referred to as 'P2P communication link') corresponding to the P2P mode is established between the first NFC device and the second NFC device. In this case, for example, the first NFC device transmits first data to the second NFC device by using the P2P communication link. Thereafter, the second NFC device transmits second data to the first NFC device by using the same P2P communication link. Thereby, the interactive communication is implemented.

The communication data in the P2P mode, i.e., the data that is transmitted and received when the P2P communication link is established is data based on the defined communication data format 'NDEF' (NFC Data Exchange Format). The NDEF data includes at least a user ID. Also, when an execution instruction of any function such as print and scan is issued from the mobile terminal 5, the NDEF data also includes function executing instruction information (for example, the print instruction or scan instruction described above) indicating the execution instruction.

The R/W mode and the CE mode are modes for performing unidirectional communication between a pair of NFC devices. The CE mode is a mode in which an NFC device operates as a 'card', which is a format defined by the NFC Forum. The Reader mode is a mode for reading data from the NFC device that is operating as a card in the CE mode. The Writer mode is a mode for writing data to the NFC device that is operating as a card in the CE mode.

For example, when the Reader mode is activated in a first NFC device and the CE mode is activated in a second NFC device, a communication link corresponding to the Reader mode and CE mode is established between the first NFC device and the second NFC device. In this case, the first NFC device can execute an operation of reading out data from a pseudo-card in the second NFC device by using the established communication link, thereby receiving the data from the second NFC device.

In the meantime, for example, when the Writer mode is activated in the first NFC device and the CE mode is activated in the second NFC device, a communication link corresponding to the Writer mode and CE mode is established between the first NFC device and the second NFC device. In this case, the first NFC device can execute an operation of writing data to a pseudo-card in the second NFC device by using the established communication link, thereby transmitting the data to the second NFC device.

Accordingly, a combination of the modes in which a pair of NFC devices performs NFC communication includes five patterns, i.e., (P2P mode, P2P mode), (Reader mode, CE mode), (Writer mode, CE mode), (CE mode, Reader mode) and (CE mode, Writer mode). In the meantime, the NFC device cannot form a state where both the Reader mode and the Writer mode are activated. That is, the NFC device stops the Writer mode when the Reader mode is activated. On the other hand, the NFC device stops the Reader mode when the Writer mode is activated.

Also, the NFC device can establish a communication link corresponding to a mode that is activated but cannot establish a communication link corresponding to a mode that is not activated. For example, when the P2P mode is activated and the other modes (the R/W mode, the CE mode) are not activated in the MFP 3, the MFP 3 can establish the P2P communication link but cannot establish the other communication links.

The NFC communication is further described. Specifically, a Poll operation and a Listen operation, which are executed by the NFC device, are described.

The Poll operation is an operation of transmitting a polling signal and receiving a response signal to the polling signal. The Listen operation is an operation of receiving a polling signal and transmitting a response signal to the polling signal. The NFC communication units of the MFP 3 and the mobile terminal 5 execute the Poll operation and the Listen operation.

The NFC communication unit 17 of the MFP 3 can operate in any of a Poll mode for executing the Poll operation, a Listen mode for executing the Listen operation and a mode (hereinafter, referred to as 'non-execution mode') in which both of the Poll mode and the Listen mode is not executed. Specifically, the NFC communication unit 17 is configured to repeatedly operate sequentially in order of the Poll mode, the Listen mode and the non-execution mode.

During the operation in the Poll mode, when the NFC communication unit 17 transmits the polling signal and receives the response signal from an NFC device, which is the other party of communication, within a particular time period, the NFC communication unit 17 transmits to the other party of communication an inquiry signal for inquiring in which mode the NFC device, which is a transmission source of the response signal, is activated. As a result, the NFC communication unit receives an activation mode signal from the other party of communication.

During the operation in the Listen mode, the NFC communication unit 17 monitors whether the polling signal is received from the other party of communication. When the polling signal is received, the NFC communication unit 17 transmits a response signal. When the NFC communication unit 17 transmits the response signal to the other party of communication, the NFC communication unit 17 further receives the inquiry signal from the other party of communication. When the NFC communication unit 17 receives the inquiry signal from the other party of communication, the NFC communication unit 17 transmits the activation mode signal to the other party of communication.

During the operation in the non-execution mode, the NFC communication unit 17 does not transmit the polling signal. Also, even when the polling signal is received from the outside, the NFC communication unit 17 does not transmit the response signal.

Also, the NFC communication unit 37 of the mobile terminal 5 repeatedly executes the Poll mode, the Listen mode and the non-execution mode, as described above. Meanwhile, in below descriptions, an NFC device having executed the Poll operation is referred to as 'Poll device' and an NFC device having executed the Listen operation is referred to as 'Listen device'.

When the NFC communication unit 17 executes the Poll operation and thus receives the response signal and the activation mode signal from the other party of communication, respective processing for subsequent communication is transferred to the CPU 11. Specifically, the information (i.e., the information indicated by the received activation mode signal) indicating which mode the other party of communication (for example, the mobile terminal 5), which is a Listen device, can execute is transferred from the NFC communication unit 17 to the CPU 11.

The CPU 11 determines in which mode the MFP 3 should operate, based on a current state (i.e., the mode that is currently activated in the MFP 3) of the MFP 3 and the information transmitted from the NFC communication unit 17. Specifically, the CPU 11 determines in which mode the MFP 3, which is a Poll device, should operate, as follows.

That is, according to the NFC standards, a Poll device can operate in the P2P mode or R/W mode but cannot operate in the CE mode. Therefore, when the MFP 3 is a Poll device, the CPU 11 determines that the MFP 3 should operate in the P2P mode or in the R/W mode. For example, when a current state of the MFP 3, which is a Poll device, is a state where the P2P mode is activated and the R/W mode is not activated and the information transmitted from the NFC communication unit 17 indicates that the other party of communication, which is a Listen device, is activated in the P2P mode, the CPU 11 determines that the MFP 3 should operate in the P2P mode.

In this case, the CPU 11 transmits an Activation command corresponding to the P2P mode to the other party of communication and receives an OK command from the other party of communication. Thereby, a communication link of the P2P mode is established between the MFP 3, which is a Poll device, and the other party of communication, which is the Listen device.

Also, even when the NFC communication unit 17 executes the Listen operation, i.e., the MFP 3 is the Listen device, respective processing for subsequent communication is transferred to the CPU 11. The CPU 11 determines in which mode the MFP 3 should operate, based on the Activation signal received from the other party of communication, which is the Poll device. Specifically, the CPU 11 determines in which mode the MFP 3, which is the Listen device, should operate, as follows.

That is, according to the NFC standards, the Listen device can operate in the P2P mode or CE mode but cannot operate in the R/W mode. Therefore, when the MFP 3 is the Listen device, the CPU 11 determines that the MFP 3 should operate in the P2P mode or in the CE mode. For example, when a current state of the MFP 3, which is the Listen device, is a state where the P2P mode is activated and the CE mode is not activated and a current state of the other party of communication, which is the Poll device, is a state where the P2P mode is activated, the CPU 11 receives the Activation command corresponding to the P2P mode from the other party of communication.

In this case, the CPU 11 determines that the MFP 3 should operate in the P2P mode, and transmits the OK command to the other party of communication. Thereby, a communication link of the P2P mode is established between the MFP 3, which is the Listen device, and the other party of communication, which is the Poll device.

Also, for example, when the current state of the MFP 3, which is the Listen device, is a state where the CE mode is activated and the P2P mode is not activated and the current state of the other party of communication, which is the Poll device, is a state where the Reader mode or Writer mode is activated, the CPU 11 receives the Activation command corresponding to the R/W mode from the other party of communication.

In this case, the CPU 11 determines that the MFP 3 should operate in the CE mode, and transmits the OK command to the other party of communication. Thereby, a communication link corresponding to the CE mode and the R/W mode is established between the MFP 3, which is the Listen device, and the other party of communication, which is the Poll device.

In the meantime, when the communication link corresponding to the CE mode and the R/W mode is established, the CPU 11 further receives information, which indicates whether the other party of communication is to operate in the Reader mode or in the Writer mode, from the other party of communication.

Therefore, for example, when the information indicating that the other party of communication is to operate in the Reader mode is received, a communication link corresponding to the CE mode and the Reader mode is established between the MFP 3, which is the Listen device, and the other party of communication, which is the Poll device. Also, for example, when the information indicating that the other party of communication is to operate in the Writer mode is received, a communication link corresponding to the CE mode and the Writer mode is established between the MFP 3, which is the Listen device, and the other party of communication, which is the Poll device.

In the below, MFP control processing that is executed by the CPU 11 of the MFP 3 is described with reference to FIGS. 3 to 5. FIG. 3 is a flowchart illustrating the MFP control processing. When power is input and thus the CPU 11 of the MFP 3 starts to operate, the CPU 11 reads out and executes a program of the MFP control processing stored in the flash memory 14.

When starting the MFP control processing illustrated in FIG. 3, the CPU 11 performs an initial setting in S110. Specifically, the CPU 11 sets a state of the NFC communication of the MFP 3 to an initial state where the Reader mode and the P2P mode are activated (ON) and the Writer mode and the CE mode are not activated (OFF). Also, the CPU 11 sets the SFL function to be valid (ON). Further, the CPU 11 sets the login user information to 'public'. In addition, the CPU 11 performs the necessary initial processing. In this way, at the initial state, the SFL function is set to be valid and the login user is set to 'public'.

In S120, the CPU 11 determines whether the NFC device such as the mobile terminal 5 and the IC card is held up over the MFP 3. In the determination, it can be determined that the NFC device is held up, when the information of the activation mode signal is notified from the NFC communication unit 17 operating in the Poll mode or the information of the inquiry signal is notified from the NFC communication unit 17 operating in the Listen mode.

When it is not determined in S120 that the NFC device is held up, the CPU 11 determines in S140 whether a print key is pushed on the MFP 3. When it is determined that the print key is pushed, the CPU 11 determines in S150 whether the print function setting for the login user set as the login user information is set to be ON (valid) by referring to the user registration table (FIG. 2). When the print function setting for the login user is OFF, the CPU 11 returns to the processing of S120 without executing the print function. On the other hand, when the print function setting for the login user is ON, the CPU 11 executes print processing in S160 and returns to the processing of S120. The print processing of S160 is processing of enabling the printer unit 20 to execute the print operation, based on the print data input to the MFP 3.

When it is not determined in S140 that the print key is pushed, the CPU 11 determines in S170 whether the scan key is pushed on the MFP 3. When the scan key is not pushed, the CPU 11 returns to the processing of S120. When it is determined that the scan key is pushed, the CPU 11 determines in S180 whether the scan function setting for the login user set as the login user information is set to be ON (valid) by referring to the user registration table (FIG. 2). When the scan function setting for the login user is OFF, the CPU 11 returns to the processing of S120 without executing the scan function. On the other hand, when the scan function setting for the login user is ON, the CPU 11 executes scan processing in S190 and returns to the processing of S120. The scan processing of S190 is processing of enabling the scanner unit 21 to scan a document set on the MFP 3.

When it is determined in S120 that the NFC device is held up, the CPU 11 executes communication processing in S130. The communication processing of S130 is illustrated in detail in FIG. 4. When the CPU 11 proceeds to the communication processing of S130, the CPU 11 determines in S310 that whether the P2P communication link is established, as illustrated in FIG. 4. Specifically, if the MFP 3 is executing the Poll operation, when the CPU 11 transmits the Activation command corresponding to the P2P mode to the NFC device, which is the other party of communication, and receives an OK command from the other party of communication, the CPU 11 determines that the P2P communication link is established. On the other hand, if the MFP 3 is executing the Listen operation, when the CPU 11 receives the Activation command corresponding to the P2P mode from the NFC device, which is the other party of communication, and transmits an OK command to the other party of communication, the CPU 11 determines that the P2P communication link is established.

When the P2P communication link is established (S310: YES), the CPU 11 performs data communication (data communication by data having the NDEF format) in the P2P mode in S320, thereby receiving a variety of information through the NFC communication unit 17. Specifically, the CPU 11 receives at least the inherent user ID and function executing instruction information stored in the NFC device, which is the other party of communication. In the meantime, regarding the function executing instruction information, when the other party of the communication issues any function executing instruction (for example, the print instruction, the scan instruction and the like described above), the corresponding information is received. However, when the NFC device is held up over the MFP 3 without issuing the function executing instruction in the other party of the communication, the function executing instruction information is not received.

The CPU 11 determines in S330 whether the print or scan instruction is received as the function executing instruction information. When the holding up print application or holding up scan application is activated in the other party of communication and the print or scan instruction is thus issued from the activating application, the print or scan instruction is transmitted from the other party of communication. In this case, the CPU 11 receives the transmitted print or scan instruction in the processing of S320.

When the print or scan instruction is received in S330, the CPU 11 executes function execution processing in S340. The function execution processing is illustrated in detail in FIG. 5. As illustrated in FIG. 5, when the function execution processing starts, the CPU 11 determines a type of the received function executing instruction information in S410. When the received function executing instruction information is the print instruction, the CPU 11 determines in S420 whether the print function setting for the login user set as the login user information is set to be ON (valid) by referring to the user registration table (FIG. 2). When the print function setting for the login user is OFF, the CPU 11 displays an error in S440 and returns to the processing of S120 (FIG. 3). On the other hand, when the print function setting for the login user is ON, the CPU 11 executes the print processing in S430 and returns to the processing of S120.

The print processing of S430 is performed as follows. First, the CPU 11 switches the communication from the NFC communication to the wireless LAN communication and receives the print data from the NFC device, which is the other party of communication, via the AP 7 through the wireless LAN communication unit 18. Then, the CPU 11 enables the printer unit 20 to print the received print data.

Meanwhile, in this illustrative embodiment, the reason to transmit and receive the print data by the wireless LAN communication, not the NFC communication, is as follows. That is, a communication speed of the NFC communication system is slower than that of the wireless LAN communication. For this reason, if the NFC communication is used as the communication for transmission of the print data from the other party of communication (the mobile terminal 5 and the like) to the MFP 3, it may take much time to transmit the print data. Therefore, in this illustrative embodiment, when executing the holding up print, the wireless LAN communication having a faster communication speed than the NFC communication is used for transmission of the print data. After executing the print processing in S430, the CPU 11 returns to S120 (FIG. 3).

When it is determined in S410 that the received function executing instruction information is the scan instruction, the CPU 11 determines in S450 whether the scan function setting for the login user set as the login user information is set to be ON (valid) by referring to the user registration table (FIG. 2). When the scan function setting for the login user is OFF, the CPU 11 displays an error in S470 and returns to the processing of S120 (FIG. 3). On the other hand, when the scan function setting for the login user is ON, the CPU 11 executes the scan processing in S460 and returns to the processing of S120.

The scan processing of S460 is performed as follows. First, the CPU 11 scans a document by the scanner unit 21. Then, the CPU 11 switches the communication from the NFC communication to the wireless LAN communication and transmits the scanned image data to the NFC device, which is the other party of communication, via the AP 7 through the wireless LAN communication unit 18. Meanwhile, the reason to transmit the scanned image data by the wireless LAN communication, not the NFC communication, is the same as the reason (which has been described above) to use the wireless LAN communication for transmitting and receiving the print data upon the execution of the holding up print. After executing the scan processing in S460, the CPU 11 returns to S120 (FIG. 3).

Returning to FIG. 4, the communication processing (S130 in FIG. 3) is continuously described. When it is determined in S330 that any of the print instruction and the scan instruction is not received in the data communication of the P2P mode, the CPU 11 proceeds to processing of S360. In S360, the CPU 11 determines whether the user ID received in S320 has been previously registered in the MFP 3, i.e., in the user registration table (refer to FIG. 2) of the flash memory 14.

When it is determined in S360 that the received user ID has not been registered, the CPU 11 displays a login failure in S380 and returns to S120. The login failure display in S380 is a display to notify the user that the user ID of the NFC device held up over the MFP 3 has not been registered in the MFP 3. For example, a message such as 'please check again the registration' is displayed on the display unit 15. Also, a specific denial sound is generated from a voice output unit (not illustrated), together with the display.

When it is determined in S360 that the received user ID has been registered, the CPU 11 executes login processing of the user ID in S370. Specifically, the received user ID (the user thereof) is set as the login user information. For example, when the user ID of the user A is received, the user ID of the user A is set as the login user information. Thereby, a state where the user A logs in to the MFP 3 is made.

Also, when it is determined in S310 that the P2P communication link is not established, the CPU 11 proceeds to S360 via S350 and updates the setting of the login user. That is, when it is determined in S310 that the P2P communication link is not established, the CPU 11 establishes a communication link between the NFC device, which is the other party of the communication, and the Reader-CE. In the meantime, the MFP 3 is in the Reader mode and the other party of communication is in the CE mode. The CPU 11 of the MFP 3 receives the user ID from the other party of communication through the NFC communication unit 17 in the Reader mode. When the user ID of the other party of communication is received in S350, the CPU 11 executes processing of S360 and thereafter on the basis of the received user ID. That is, when the received user ID has been previously registered in the user registration table, the CPU 11 executes the login processing of the corresponding user ID (S370).

According to the communication system 1 of this illustrative embodiment configured as described above, the user who wants to log in to the MFP 3 holds up the IC card, in which the user ID to be logged in is stored, over the MFP 3, so that the MFP 3 receives the user ID and thus the user can log in to the MFP 3. Also, the user can log in to the MFP 3 by holding up the mobile terminal having the user ID stored therein over the MFP 3. In this illustrative embodiment, the mobile terminal 5 has the NFC communication unit 37 and the user ID is stored therein. For this reason, when the mobile terminal 5 is held up over the MFP 3, the login can be made by the user ID of the mobile terminal 5.

In the meantime, the user of the mobile terminal 5 can use the MFP 3 in accordance with the setting state of the SFL function, the setting state of the login user information and the function restricting setting state for the login user when the SFL function is valid, in the MFP 3, without logging in to the MFP 3 with the user ID of the mobile terminal 5.

For example, even when the login user of the MFP 3 is kept to 'public', the user of the mobile terminal 5 can issue the scan instruction by activating the holding up scan application and execute the holding up scan by holding up the mobile terminal 5 over the MFP 3. Also, when the SFL function is set to be invalid, the user of the mobile terminal 5 can execute the holding up print or holding up scan by using the holding up application.

Further, even though the SFL function is set to be valid, the user of the mobile terminal 5 can log in to the MFP 3 with the user ID of the mobile terminal 5, thereby using the function permitted for the user ID. For example, the print function is not permitted for the public user. However, when the print function is set to be usable for the user ID of the mobile terminal 5, the user of the mobile terminal 5 logs in to the MFP 3 with the user ID of the mobile terminal 5 by holding up the mobile terminal 5 over the MFP 3. After the login, when the user activates the holding up print application to thus issue the print instruction and then holds up the mobile terminal 5 over the MFP 3, it is possible to execute the holding up print.

That is, according to the MFP 3 of this illustrative embodiment, when the user just wants to log in to the MFP 3, the user holds up the medium having the user ID stored therein (the IC card, the mobile terminal 5 and the like) over the MFP 3, thereby logging in to the MFP 3. Also, the user of the mobile terminal 5 can enable the MFP 3 to execute the print or scan operation by using the holding up application within a range in which the restriction by the SFL function is not placed, even though the user does not log in to the MFP 3. Also, even though the SFL function is set to be valid, the user of the mobile terminal 5 can use the function, which is set to be usable for the user of the mobile terminal 5 in the user registration table, by logging in to the MFP 3 with the user ID of the mobile terminal 5. In this illustrative embodiment, the user A is set to use both the print function and the scan function. Therefore, when the user of the mobile terminal 5 is the user A (the user ID of the user A is stored in the mobile terminal 5), the user can execute the holding up print and the holding up scan without restrictions by logging in to the MFP 3 with the mobile terminal 5.

Second Illustrative Embodiment

Figure 4:
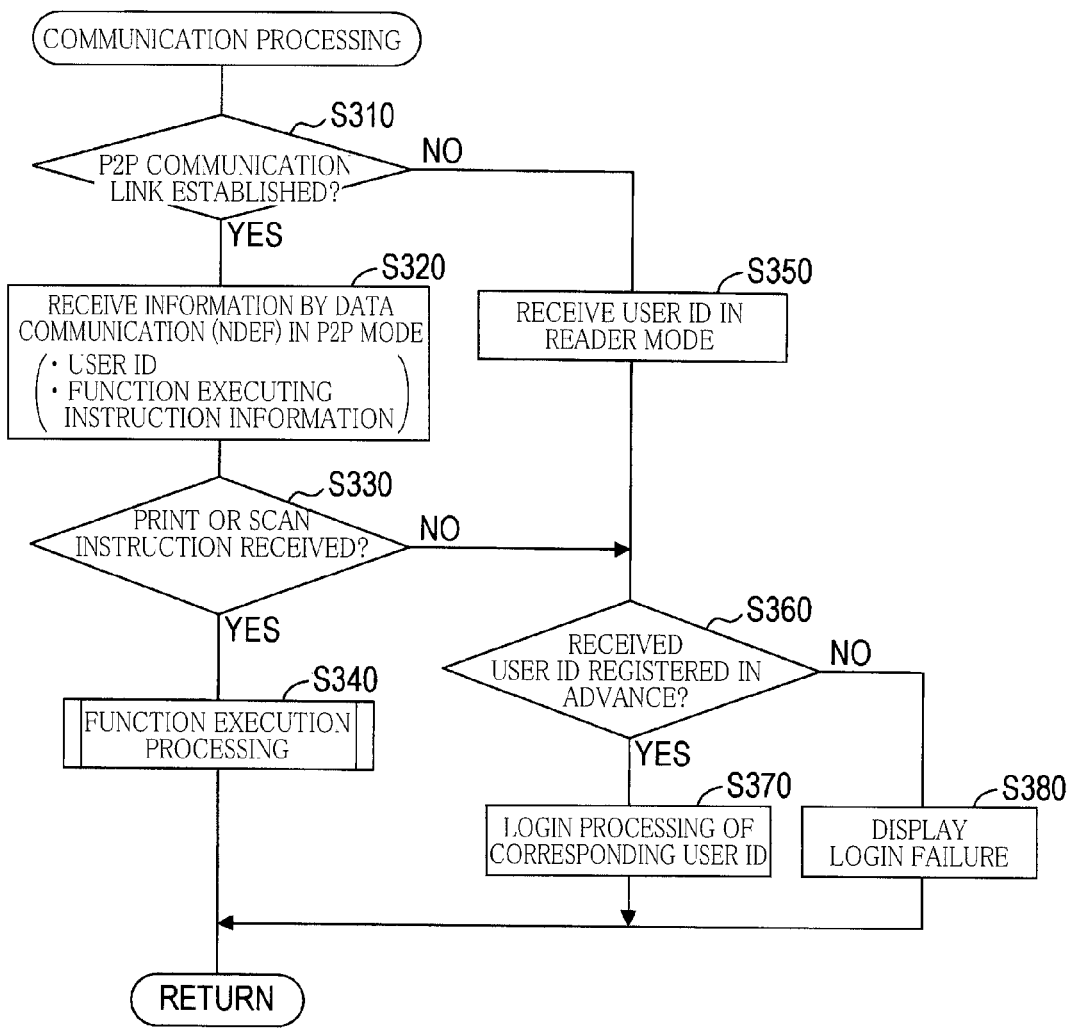
FIG. 4 is a flowchart showing detailed communication processing of S130 in the MFP control processing of FIG. 3.
Figure 5:
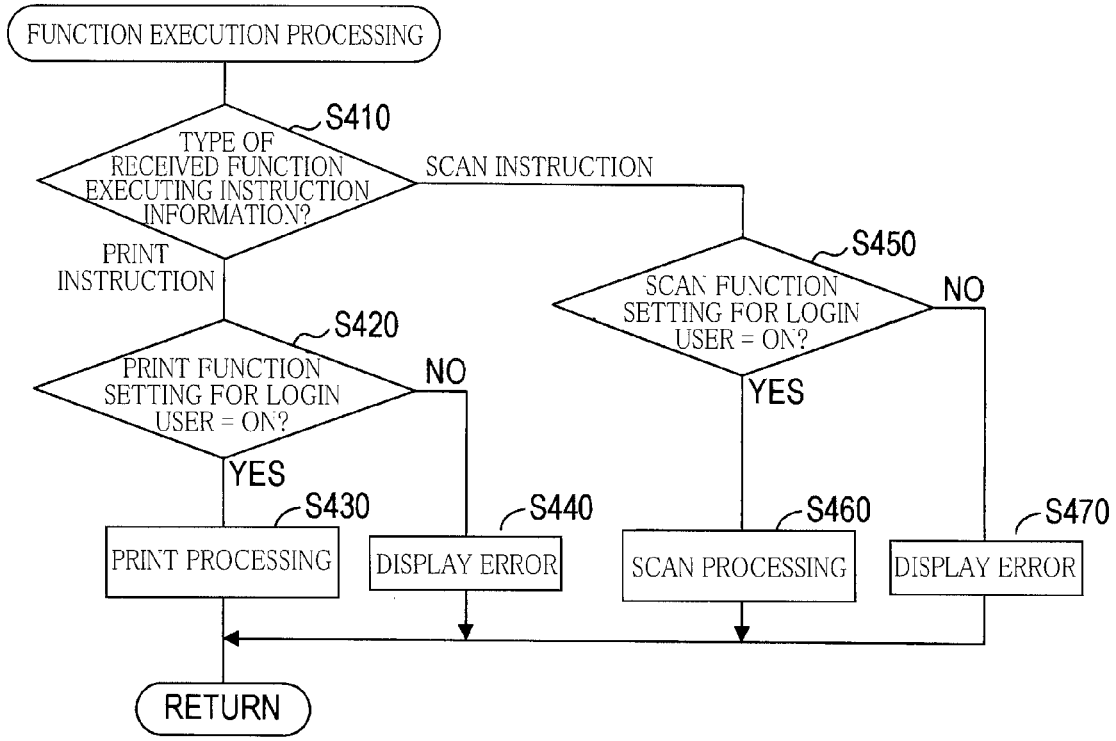
FIG. 5 is a flowchart showing detailed function execution processing of S340 in the communication processing of FIG. 4.

In the below, a second illustrative embodiment different from the first illustrative embodiment illustrated in FIG. 4 is described. In the first illustrative embodiment, the processing of FIG. 4 has been described as the communication processing of S130 in the MFP control processing of FIG. 3. However, in this illustrative embodiment, processing of FIG. 6 is executed as the communication processing of S130.

Figure 6:
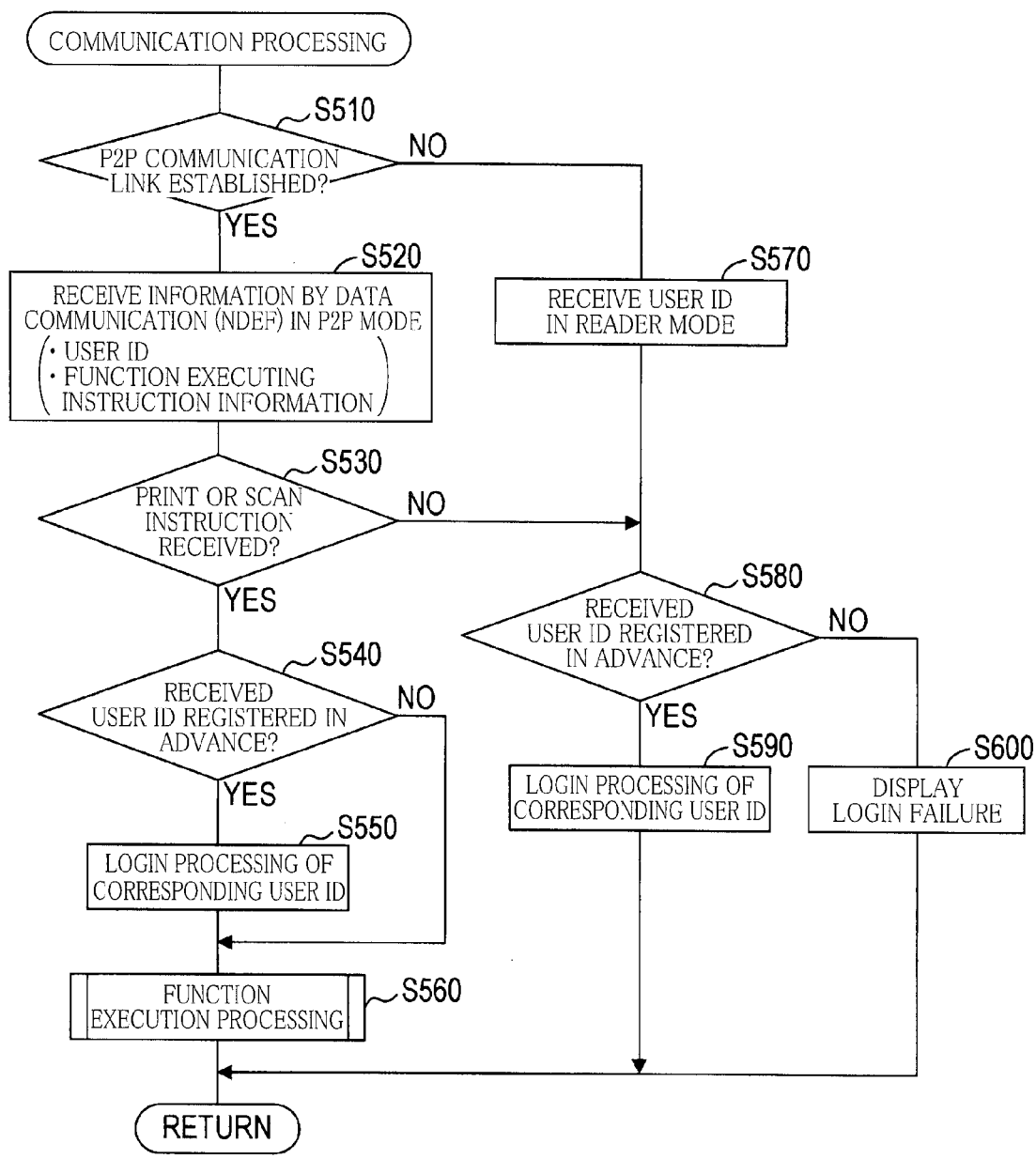
FIG. 6 is a flowchart showing communication processing (corresponding to S130 of FIG. 3) in detail according to a second illustrative embodiment.

In the MFP control processing of FIG. 3, when it is determined in S120 that the NFC device is held up, the CPU 11 of the MFP 3 starts communication processing illustrated in FIG. 6, as the communication processing of S130. Meanwhile, in the communication processing of FIG. 6, processing of S510 to S550 is the same as the processing of S310 to S330 in the communication processing of the first illustrative embodiment illustrated in FIG. 4, and processing of S570 to S600 is the same as the processing of S350 to S380 in the communication processing of the first illustrative embodiment illustrated in FIG. 4. Therefore, regarding the communication processing of FIG. 6, processing different from the communication processing of the first illustrative embodiment illustrated in FIG. 4, i.e., processing of S540 to S560 is described and the descriptions about the same processing as the first illustrative embodiment are omitted.

In the communication processing of this illustrative embodiment illustrated in FIG. 6, when it is determined in S530 that the print instruction or scan instruction is received, the CPU 11 proceeds to S540. In S540, the CPU 11 determines whether the user ID received in S520 has been previously registered in the MFP 3, i.e., in the user registration table (refer to FIG. 2) of the flash memory 14. When the received user ID has not been registered, the CPU 11 proceeds to S560 and executes the function execution processing. In the meantime, the function execution processing of S560 is the same as the processing of the first illustrative embodiment illustrated in FIG. 5.

When it is determined in S540 that the received user ID has been previously registered in the MFP 3, the CPU 11 executes the login processing of the corresponding user ID in S550.

Specifically, the CPU 11 sets the received user ID (the user thereof) as the login user information. Then, after executing the login processing of S550, the CPU 11 executes the function execution processing in S560.

According to the MFP 3 of this illustrative embodiment configured to execute the processing of FIG. 6 as the communication processing, when the user of the mobile terminal 5 wants to execute the holding up print, for example, the user issues the print instruction by the holding up print application without the login in advance and then holds up the mobile terminal 5 over the MFP 3, thereby executing the holding up print. That is, even though the login user of the MFP 3 is different from the user of the mobile terminal 5 (for example, public), when the mobile terminal 5 having activated the holding up print application is held up over the MFP 3 at the corresponding state, the login processing by the user ID of the mobile terminal 5 is performed and the holding up print is executed after the login processing.

That is, it is not necessary to twice perform the holding up operation of the mobile terminal 5 where the mobile terminal 5 is first held up over the MFP 3 for the login and then the mobile terminal 5 is again held up so as to execute the holding up print or holding up scan. When the mobile terminal 5 is just once held up over the MFP 3 after the holding up application is activated to issue a necessary instruction, both the login by the user ID of the mobile terminal 5 and the execution of the holding up application can be performed.

Other Illustrative Embodiments (1) In the user registration table illustrated in FIG. 2, the setting contents indicating whether the respective functions can be used for each user are just exemplary. That is, an administrator and the like can arbitrarily set how to use the print function and the scan function for each user.

Also, in the user registration table illustrated in FIG. 2, the print function and the scan function are exemplified as the functions that can be set for each user as regards whether or not to use the same. This is also just exemplary. That is, it is possible to appropriately set whether any function of the respective functions of the MFP 3 can be individually restricted for each user. For example, it is possible to set whether the other functions such as the copy, facsimile functions and the like can be used for each user, in addition to the print and scan functions.

(2) It is not necessarily required to store the user registration table in the MFP 3. For example, the user registration table may be stored in a server capable of performing data communication with the MFP 3 and the information of the user registration table may be received from the server, as required. Alternatively, the user ID may be transmitted from the MFP 3 to the server so that the server compares the user ID and the user registration table, and a result of the comparison may be received from the server.

(3) In the above illustrative embodiments, when executing the holding up print, the wireless LAN communication is used for transmission of the print data, instead of the NFC communication. However, the NFC communication may be used for transmission of the print data. This is also the same for the transmission of the scanned image data when executing the holding up scan.

(4) In the above illustrative embodiments, the MFP 3 has been exemplified as the function executing device of the present invention. This is just exemplary. That is, the present invention can be applied to all function executing devices having at least one specific function such as the print function, the scan function and the like. Also, the mobile terminal 5 is just an example of the external device of the present invention. That is, the present invention can be applied to all devices capable of performing wireless communication by the near field communication format.

(5) In the above illustrative embodiments, the NFC communication has been exemplified as the near field communication system of the present invention. However, the other wireless communication system, rather than the NFC communication, can be adopted as the near field communication format.

What is claimed is:

1. A function executing device comprising:
a communication unit configured to perform wireless communication with an external device by a particular near field wireless communication format;
a specific function unit configured to execute at least one specific function;
a storage configured to store function execution restricting information indicating whether an execution of the at least one specific function is restricted or not for each of at least one registered user, and
a controller,
wherein the controller is configured to:
receive at least one of user authentication information and a function execution instruction information including an instruction for executing one of the at least one specific function, from the external device through the communication unit, after the external device has been held up over the function executing device;
when the controller receives the user authentication information and the function execution instruction information, determine whether the at least one specific function that is specified by the received function execution instruction information is restricted for a first user specified by the received user authentication information and execute the at least one specific function when it is determined that the at least one specific function is not restricted for the first user;
when the controller receives the function execution instruction information and does not receive the user authentication information, determine whether the at least one specific function is restricted for a second user that is a predetermined user and execute the at least one specific function when it is determined that the at least one specific function is not restricted for the second user; and
when the controller receives the user authentication information and does not receive the function execution instruction information, determine whether the first user is one of the at least one registered user and set the first user as a current-authenticated user when it is determined that the first user is included in the at least one registered user.

2. The function executing device according to claim 1, wherein when the current-authenticated user is set, the controller is configured to restrict the execution of at least one of the at least one specific function restricted for the current-authenticated user in the function execution restricting information.

3. The function executing device according to claim 1, wherein when the function execution restricting information indicates that an execution of the one of the at least one specific function is restricted, the controller is configured to restrict the specific function unit to executing the one of the at least one specific function, and when the function execution restricting information indicates that the execution of the one of the at least one specific function is not restricted, the controller is configured to cause the specific function unit to execute the one of the at least one specific function.

4. The function executing device according to claim 1, wherein the specific function unit comprises at least one of (a) an image formation function unit configured to execute an image forming function, as the one specific function, to form an image on a recording medium, and (b) an image read function unit configured to execute an image reading function, as the one specific function, to read an image of a document and to generate image data indicating the image.

5. The function executing device according to claim 4, wherein the function execution instruction information comprises at least one of image formation instruction information for instructing the image formation function unit to execute the image forming function and image read instruction information for instructing the image read function unit to execute the image reading function.

6. The function executing device according to claim 1, wherein the communication unit is configured to perform the wireless communication with the external device by an NFC (Near Field Communication) format, which is a communication system conforming to an NFC standard, and wherein the controller is configured to receive the function execution instruction information when a P2P (Peer to Peer) communication link of the NFC standard is established with the external device through the communication unit.

7. The function executing device according to claim 6, wherein the controller is configured to receive the user authentication information when the P2P communication link of the NFC standard is not established with the external device through the communication unit.

* * * * *